United States Patent [19]

Clark et al.

[11] Patent Number: 4,768,163
[45] Date of Patent: Aug. 30, 1988

[54] MAGNETIC STRIPE AND WAND READER INTERFACE EMPLOYING OFF-THE-SHELF PROGRAMMABLE COMMUNICATIONS INTERFACE

[75] Inventors: Vincent M. Clark, Kingsboro, Mass.; Dennis W. Chasse, Nashua, N.H.; David R. Bourgeois, Framingham, Mass.

[73] Assignee: Honeywell Bull Inc., Minneapolis, Minn.

[21] Appl. No.: 607,837

[22] Filed: May 7, 1984

[51] Int. Cl.⁴ .................. G06F 3/06; G06F 13/12
[52] U.S. Cl. .................. 364/900; 235/482
[58] Field of Search ... 364/200 MS File, 900 MS File; 235/449, 462, 474, 482; 360/2; 340/707, 708, 365 L; 382/59, 64, 65

[56] References Cited

U.S. PATENT DOCUMENTS

| | | | |
|---|---|---|---|
| 3,916,386 | 10/1975 | Teixeira et al. | 364/900 |
| 4,189,743 | 2/1980 | Schure et al. | 358/93 |
| 4,405,984 | 2/1981 | Siegel et al. | 364/410 |
| 4,417,320 | 11/1983 | Ei | 364/900 |
| 4,481,412 | 12/1984 | Fields | 235/472 |
| 4,554,445 | 11/1985 | Chasse et al. | 235/472 |

FOREIGN PATENT DOCUMENTS 2027240  6/1979  United Kingdom .

Primary Examiner—Archie E. Williams, Jr.
Assistant Examiner—Michael J. Ure
Attorney, Agent, or Firm—Nicholas Prasinos; John S. Solakian; George Grayson

[57] ABSTRACT

An apparatus and a method for interfacing a commercially-available programmable communication interface (PIC) with a magnetic swipe reader or a wand type reader. The invention modifies the raw signals of the magnetic wand and magnetic swipe readers by removing noise and selecting the appropriate reader and track, stretching the clock pulses of the reader, and latching data into a flip-flop until the data is strobed into the PIC.

5 Claims, 2 Drawing Sheets

MAGNETIC STRIPE AND WAND READER INTERFACE EMPLOYING OFF-THE-SHELF PROGRAMMABLE COMMUNICATIONS INTERFACE

RELATED APPLICATION

The following application is incorporated by reference to this application:

Application Ser. No. 865,716, filed May 22, 1986; Entitled—Magnetic Stripe and Wand Reader Interface; Inventors—Vincent M. Clark, Dennis W. Chasse, David R. Bourgeois.

BACKGROUND OF THE INVENTION

1. Field of the Invention

This invention relates generally to computer interfaces, and more particularly to an apparatus and technique that reads serial data from a magnetic card and wand reader to a microprocessor for processing, and is characterized in that the interface is comprised of a novel combination of commercially-available hardware to provide control, character synchronization and serial-to-parallel data conversion required by the microprocessor.

2. Description of the Prior Art

In a modern computer system there are a variety of devices and methods for entering data into the computer system. Some of these data entry devices include Hollerith card readers, terminal devices, magnetic tape transport devices, magnetic card readers and magnetic swipe readers. More recently, because of the increased use of credit cards, magnetic card readers have polifereated. In a magnetic card, data is collected and stored in a magnetic stripe integrally attached to the card. This data can be read by a magnetic card reader by placing the magnetic card in the slot and sliding it by a read head. Alternately credit card readers have been developed in the form of a wand which can read magnetically encoded signals on suitable mediums by passing the wand past the medium containing such magnetic codes. One variation of this type of storage medium is a magnetic stripe which can store data utilizing a suitable magnetic code. These stripes may be attached to a variety of products, such as is found in a supermarket, to identify the product and other of its characteristics such as price, weight, etc. Information from such products can be retrieved by means of a magnetic wand which is passed over (i.e., swiped past) the medium. There are innumerable other applications for such data collection terminals which can be located in a factory, department store, office, supermarket or in other similar locations where magnetic wand readers are utilized to input inventory, sales, or attendance data.

One of the problems in utilizing such magnetic wand readers is the requirement of an interface either between the magnetic wand or swipe reader and the processor which is to utilize the information because the processor cannot utilize the raw signals of the readers. In the industry there are several variations of encoding techniques and formats that operate with magnetic cards or magnetic stripes and are generally known as Track I, II and III type encoding. In Track II type, for example, data from the reader is comprised of a data bit stream in which every bit that is encoded on the card also has a clock output provided by the reader and associated with it. Additionally the Track II encoding structure is such that every 5 clocks represents a character. However, because there is a clock bit associated with every data bit in the stream, there is no way to determine where a character begins or ends unless a special synchronization character is detected by some device. Without such detection the receiving microprocessor would be interrupted excessively on each data bit resulting in excessive overhead, reduced throughput, and inefficient operation.

Past solutions for reading serial data from magnetic cards required complicated hardware circuitry or CPU processing to provide control for character synchronization and serial-to-parallel data conversions. One such approach provided for serially latching data bits from a reader into a serial-in-parallel-out shift register. Character synchronization and local buffering is provided in the manner that a CPU could read complete characters while bits of the next character are being assembled by hardware. This solution requires an excessive number of complex components which adversely affect power consumption and reliability; moreover they require a significant amount of processing overhead for performing such management functions.

Another solution requires a microprocessor to input the serial data from the reader. Character synchronization and serial-to-parallel data conversion is accomplished by software. Although this solution requires minimal hardware, it has the disadvantage of requiring a large software overhead, as well as total dedication of a microprocessor during a read cycle. Since most data collection terminals have only one microprocessor, they cannot be monopolized by any one device without seriously reducing efficiency.

What was needed, therefore, was a simple apparatus and a technique for providing control character synchronization and serial-to-parallel data conversion which preferably utilized readily commercially-available programmable communications hardware. One such piece of hardware commercially-available is the 8251 programmable communications interface (PIC). However, the commercially-available 8251 was designed to interface with different formats and interfaces than those utilized by magnetic wand readers or magnetic swipe readers. What was needed, therefore, was a special interface circuit between the commercially-available PIC and the magnetic wand and/or swipe readers to make the signals coming from the magnetic and swipe readers compatible to those handled by the PIC.

OBJECTS OF THE INVENTION

It is a primary object of the invention, therefore, to provide an improved interface between a microprocessor and magnetic swipe or wand type readers.

Still another object of the invention is to provide an improved apparatus and method for reading serial data to a microprocessor from magnetic card or magnetic swipe readers.

Still a further object of the invention is to provide an improved method and apparatus for reading serial data from a medium having such data encoded in a format different than the format recognizable by the interface to the microprocessor.

Yet another object of the invention is to provide an improved data collection system.

These and other objects of the invention will become apparent from a description of the preferred embodiment of the invention when read in conjunction with the drawings contained herewith.

SUMMARY OF THE INVENTION

The invention provides for an apparatus and a method of interfacing a commercially-available programmable communication interface (PIC), such as the Intel 8251-A with a magnetic swipe reader or a wand type reader to a microprocessor bus.

Referring to FIG. 1, there is shown a commercially-available Intel-type 8251 programmable communications interface (PIC) 101. In its commercially-available state the PIC 101 is designed to interface with a communication line synchronously transmitting a serial bit stream having a predetermined clock rate and sync characters. However, the object of this invention is to utilize the commercially-available PIC to interface with either a magnetic wand or magnetic swipe reader which have different clock rates and provide a different relationship between data and clock signals which are not recognizable by the as-is commercially-available PIC 101. This compatibility is provided by the circuitry of the invention so that the commercially-available PIC 101 can be utilized in applications requiring a magnetic wand type reader 111 or a magnetic swipe reader 112 for inputting data to a microprocessor 130 coupled to the PIC 101.

Both the magnetic wand 111 and the swipe reader 112 have a serial data output signal and a clock signal associated with the data output to indicate when data is valid. Additionally there is also a magnetic active signal provided by both the wand and magnetic swipe readers. The invention modifies the raw signals of the magnetic wand and magnetic swipe readers by first removing noise and selecting the appropriate reader and track. The clock pulses of the readers are then "stretched" by apparatus which is the subject of another invention filed concurrently with this invention entitled "Digital Pulse Stretcher". Also because data from the readers become valid at a time interval which is different than the time interval of the PIC for receiving valid data, this data must be latched into flip-flop 103 and held there until the appropriate positive-going pulse is available to strobe the data into the PIC. The PIC first detects a unique sequence of data bits called a start sentinel character, then frames each predetermined number of bits into characters. As each character is recognized by the PIC 101, it interrupts the microprocessor to read an entire character from the PIC, rather than interrupting the microprocessor to input the data bit by bit, which is very inefficient.

Thus it can be seen that by utilizing the standard commercially-available PIC the efficiency and throughput of microprocessor 130 is increased by at least 5:1. The PIC provides all character synchronization and serial-to-parallel data conversion with data being transferred to the microprocessor upon the assertion of a data ready interrupt signal from the PIC. This apparatus and method also provides the capability to read different Track formats. Moreover, a minimum of components, lower power dissipation, and increased reliability with minimum processor overhead is obtained.

BRIEF DESCRIPTION OF THE DRAWINGS

The novel features, which are characteristic of the invention, are set forth with particularity in the appended claims. The invention itself, however, both as to organization method and operation, together with further objects and advantages thereof, may be understood by reference to the following description taken in conjunction with the drawings in which:

DESCRIPTION OF A PREFERRED EMBODIMENT OF THE INVENTION

Figure 1:
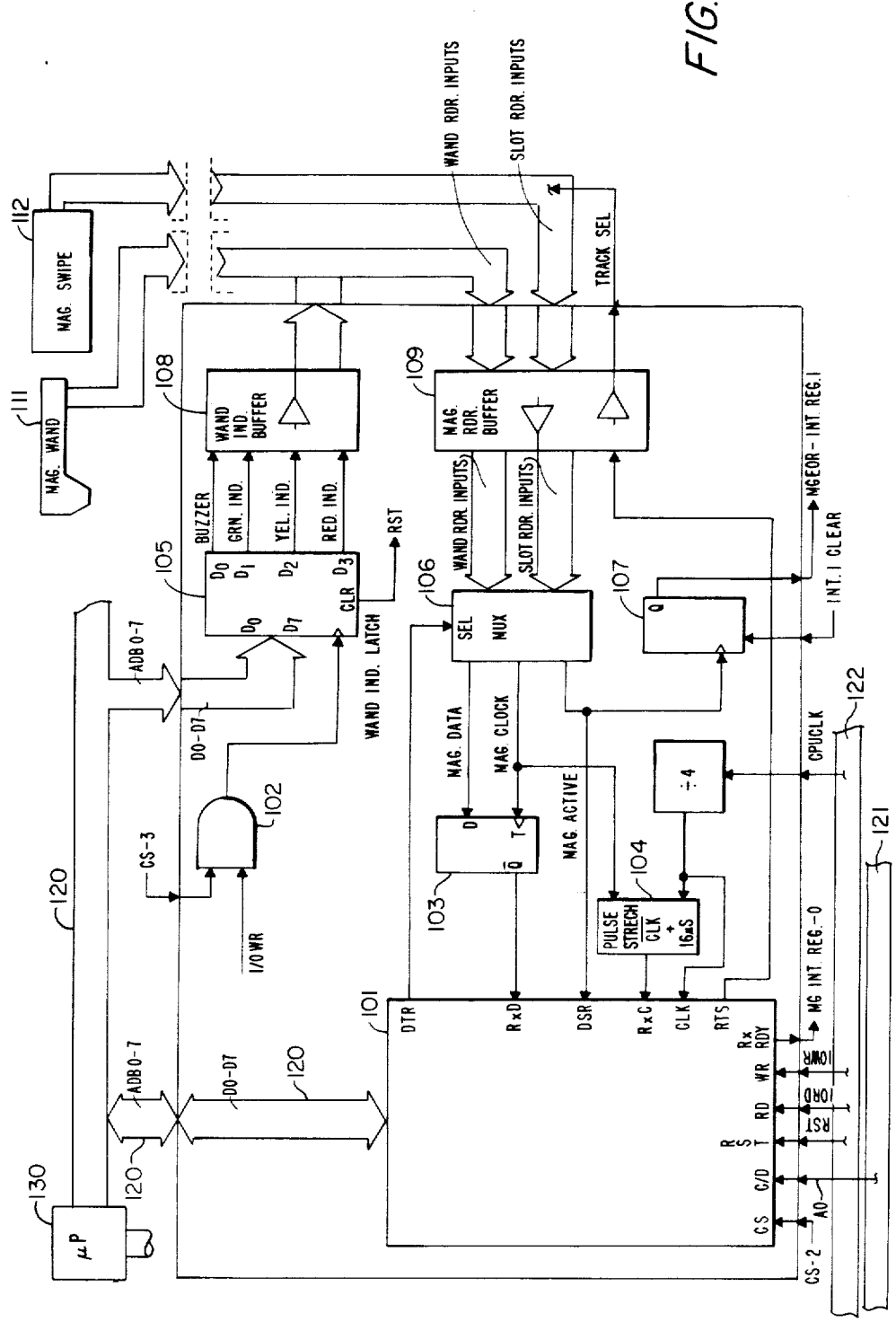
FIG. 1 is a logic block diagram of the invention.

Referring now to FIG. 1, there is shown a magnetic wand reader 111 and a magnetic swipe reader 112 coupled to a magnetic reader buffer 109. When a magnetic card is placed into the slot of the magnetic swipe reader and passed by the reader head, three signals are generated—a clock signal, a data output signal and card-present signal. Similarly when a magnetic wand is passed by a magnetically encoded medium, three similar signals are generated—a clock signal, a data output signal and a scanning-in-progress signal. These signals are applied to a magnetic reader buffer 109 comprised of a commercially-available 74LS240 Schmitt trigger inverter which conditions the input signals from the input readers by removing noise from the signals. The conditioned signals are then applied to a commercially-available 74LS258 multiplexer 106. The multiplexer, under control of a signal applied to its select terminal SEL from an output terminal DTR of the PIC 101, selects either the three signals from the magnetic wand reader or the magnetic swipe reader. Once the selection of signals from the magnetic wand or magnetic swipe reader has been made, the signals must be further conditioned. One such further conditioning requires the pulse to be stretched by a pulse stretcher 104. (This is the subject of another invention entitled "Digital Pulse Stretcher", assigned to the same assignee and filed concurrently with this invention.) Additional preconditioning of the signals is required in that data must be available to the PIC 101 through its $R_xD$ input terminal on the leading edge of the conditioned clock signal from the selected reader. This is necessary because the interval that the data from the reader is valid and the interval in which this data can be entered into the PIC is out of synchronization. (This will be further described infra using the timing diagrams of FIG. 2.) Accordingly the valid data must be latched into a commercially-available 74LS74 flip-flop 103. As shown on FIG. 1, the $\overline{Q}$ output terminal of the flip-flop 103 is coupled to the $R_xD$ terminal of the PIC 101 and data is applied to the PIC 101 when the flip-flop 103 is triggered. On the input side of the flip-flop 103 MAG DATA from the multiplexer 106 is applied to the D terminal of flip-flop 103. Additionally the MAG CLOCK from the multiplexer 106 is applied to the T terminal of flip-flop 103.

The selected third signal from the multiplexer 106 is the MAG ACTIVE signal. The MAG ACTIVE line, coupled to the DSR input of PIC 101, informs the PIC when a card is in a slot of the card reader or a wand is being used. This signal is applied to the DSR terminal of PIC 101 and also to a flip-flop 107. This signal indicates that either the magnetic swipe or magnetic wand reader is active, depending on which one has been selected. In the case of the magnetic swipe reader, it indicates that a card is in the reader. In the case of the magnetic wand reader, it indicates that there is relative motion between it and a magnetic stripe. In its quiescent state there is no activity and its logic signal is high. When a card is in the reader or the wand is used, the signal goes low and upon the termination of the transaction, the signal goes high. This provides a clock input to flip-flop 107 which latches a logic high signal MGEOR-INT. REG. 1 signal. This signal is used to interrupt the microprocessor 130 and to tell it that the transaction is ended and that the microprocessor should communicate with the PIC 101 and reinitialize the PIC 101 so another magnetic stripe card can be read.

So far the description has centered on information that is supplied from the magnetic wand or magnetic swipe readers to the microprocessor 130 via PIC 101. However, information also flows in the other direction from the microprocessor 130 to the magnetic wand reader 111. This reader has three light-emitting diode indicator lights and an audible buzzer. These indicator lights and buzzer are controlled by signals from wand indicator buffer 108, which is a commercially-available octal buffer 74LS240. The wand indicator buffer 108 provides the appropriate buffering for the current and voltage requirements to control the indicator signals. The input to buffer 108 is provided from the 8 bit data bus 120 via another commercially-available 74LS273 4 bit latch 105. The signals to control the buzzer and the green, yellow and red indicators is strobed into the latch 105 from 8 bit data bus 120 via AND gate 102 when signal CS-3 derived from microprocessor 130, and signal I/OWR are true. Signal CS-3 selects the functionality of latch 105; whereas the I/OWR signal serves to clock data from $\mu$P to latch 105.

Thus far it has been shown how the PIC 101 interfaces with the magnetic wand and magnetic swipe readers and how the indicated signals interface with the microprocessor. The PIC 101 must also interface with the microprocessor 130 in order to process the information which is inputted by the magnetic wand or the magnetic swipe reader. Communication between the PIC 101 and the microprocessor 130 is provided by an 8 bit bidirectional bus 120 under control of control signals applied via control lines 122 and address signals applied by front panel address bus 121. In order to select the PIC 101 from other devices coupled to the microprocessor, a unique chip select address CS-2 is applied to the CS terminal of the PIC via front panel address bus 121. Once the PIC chip 101 has been selected it is possible to select one of two sets of internal registers (not shown) located in PIC 101 by applying to the least significant address line $A_O$ of the address bus 121 a select signal $A_O$ on terminal C/D.

The set of internal registers (not shown) may be either control or data registers. When one complete character is assembled in the receive register of the PIC, an interrupt signal is applied to the microprocessor 130 through receiver ready $R_xRDY$ terminal of the PIC. This interrupts the microprocessor 130, whereupon the $\mu$P selects the PIC's data register, and data in the register (not shown) of the PIC is strobed to the microprocessor 130 via data bus 120 in response to the IORD signal applied to RD terminal of the PIC 101. When it is desired to write data into the PIC 101 from the microprocessor 130, the IOWR signal applied to the WR terminal of the PIC is utilized to strobe data from the microprocessor 130 to the PIC.

Figure 2:
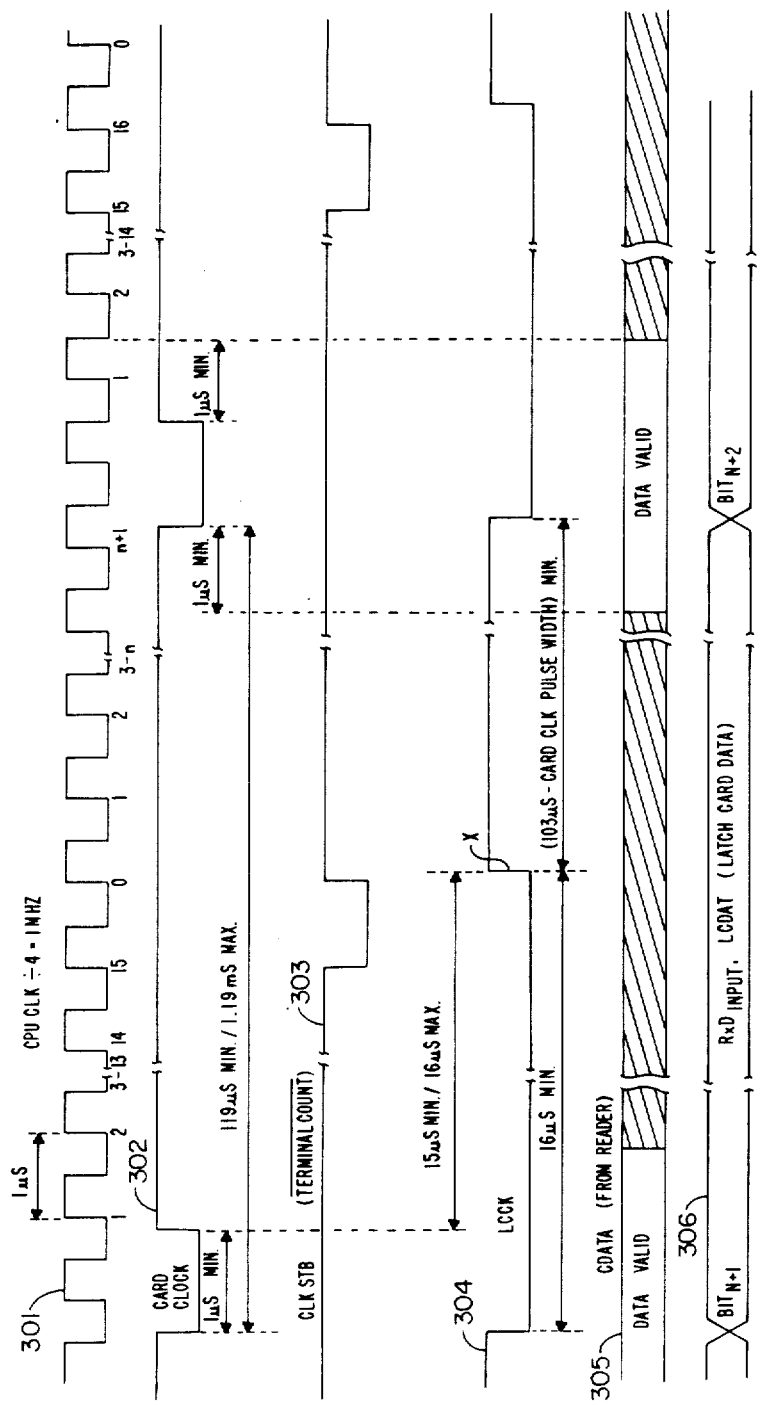
FIG. 2 is a timing diagram which illustrates the timing characteristics of the invention.

Referring now to FIG. 2 there is shown various timing diagrams 301 through 306. Timing diagrams 301-304 pertain to the pulse stretching circuitry 104, which is the subject of a related invention filed concurrent with this application and need not be discussed in detail here. The diagram 305 shows the modified data output from magnetic wand reader 111 or magnetic swipe reader 112. The data from the readers is valid during the card clock shown on diagram 302. It can be seen from diagram 305 that data from the readers is not always valid, and accordingly an indication from card clock 302 is necessary to determine when the data from the reader is valid. Once the interval is identified when data is valid, it is then necessary to latch the valid data to the PIC 101. However, because the PIC 101 latches on the rising edge of the clock and because the pulse has been stretched (see related application on Digital Pulse, Stretcher), there is a requirement that a positive-going edge be utilized to latch the data. However, as can be seen from diagram 304, the positive-going pulse at point X does not coincide with the time that data is valid. Accordingly, the valid data is latched by the negative-going pulse of diagram 302 onto the flip-flop 103 where it is stored in its valid state. The data remains stored in the valid state in flip-flop 103 and is latched to the PIC 101 at its $R_xD$ terminal by the positive-going signal X of diagram 304. Diagram 306 indicates that the valid data held in PIC 101 has been latched to the PIC at its $R_xD$ input terminal.

It will be apparent from the foregoing disclosure of the invention that numerous modifications, changes and equivalents will occur to those skilled in the art, all of which fall within the true scope contemplated by the invention.

What is claimed is:

1. An interface system for interfacing a magnetic wand type reader or magnetic swipe reader to a microprocessor via a bus system, wherein a serial data bit stream representing data characters preceded by a special character is output from said wand type reader or said magnetic swipe reader, said interface comprising:
  (a) a programmable communications interface chip (PIC) for converting data in the form of said serial data bit stream to parallel format data in the form of characters, each character comprising a predetermined plurality of data bits;
  (b) second means coupled to said PIC for storing data in a valid state until said PIC is ready to accept said valid data, said second means providing a timing interface permitting said PIC to accept data bit streams having data bit rates fluctuating within a range;
  (c) third means coupled to said second means for selecting said serial data bit stream from either from said wand type reader or said magnetic swipe reader for application to said PIC; and
  (d) fourth means coupled to said third means and receiving said serial data bit stream from either said wand type reader or said swipe reader for eliminating noise from said serial data bit stream derived from said wand type reader or magnetic card reader;

said PIC first identifying said special character and thereby being able to frame subsequent data characters into parallel format data characters.

2. The interface system of claim 1 including fifth means coupled to said third means and responsive to said PIC for providing select-signals to said third means from said PIC for selecting the signals from either the wand type reader or magnetic swipe reader.

3. An interface system for interfacing a wand type reader or magnetic card reader for reading signals to a microprocessor, wherein a serial data bit stream representing data characters preceded by a special character is output from said wand type reader or said magnetic swipe reader, said interface comprising:

(a) a programmable communications interface chip (PIC) for converting data coded in said serial bit stream to parallel format data coded in the form of characters, each character comprising a predetermined number of bits;
(b) second means coupled to said PIC for storing bit coded data in a valid state, said second means providing a timing interface permitting said PIC to accept data bit streams having data bit rates fluctuating within a range;
(c) clock means coupled to said PIC and to said second means for strobing the bit coded data from said second means to said PIC; and,
(d) third means coupled to said second means for selecting said serial data stream from either from said wand type reader or said magnetic card reader for application to said PIC;

said PIC first identifying said special character and thereby being able to frame subsequent data characters into parallel format data characters.

4. The interface system as recited in claim 3 wherein said wand type reader and magnetic reader include indicator light and buzzer signals for indicating the state of data transmitted.

5. The interface system as recited in claim 4 including indicator-storage-signal means for storing indicator signals utilized to activate the light or buzzer signals on said wand type or magnetic readers.

* * * * *